United States Patent
Liao et al.

(10) Patent No.: US 11,613,622 B2
(45) Date of Patent: Mar. 28, 2023

(54) METHOD FOR FORMING POLYESTER MATERIAL FROM RECYCLED FILM

(71) Applicant: NAN YA PLASTICS CORPORATION, Taipei (TW)

(72) Inventors: Te-Chao Liao, Taipei (TW); Chun-Che Tsao, Taipei (TW); Wen-Jui Cheng, Taipei (TW); Yueh-Shin Liu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 59 days.

(21) Appl. No.: 17/355,208

(22) Filed: Jun. 23, 2021

(65) Prior Publication Data
US 2022/0348735 A1 Nov. 3, 2022

(30) Foreign Application Priority Data
Apr. 29, 2021 (TW) ................................. 110115540

(51) Int. Cl.
*C08J 11/12* (2006.01)

(52) U.S. Cl.
CPC ............ *C08J 11/12* (2013.01); *C08J 2367/00* (2013.01)

(58) Field of Classification Search
CPC ............................... C08J 11/12; C08J 2367/00
USPC .......................................................... 521/48
See application file for complete search history.

(56) References Cited

U.S. PATENT DOCUMENTS

| 7,186,794 | B2 * | 3/2007 | Goto | ........................ C08J 11/24 528/480 |
| 8,845,840 | B2 | 9/2014 | Ledbetter et al. | |
| 2001/0009951 | A1 * | 7/2001 | Schmidt | .................. C08L 67/02 528/308.1 |
| 2005/0261470 | A1 * | 11/2005 | Goto | ........................ C08J 11/24 528/480 |

FOREIGN PATENT DOCUMENTS

| BE | 1019138 A5 * | 3/2012 |
| CN | 1250405 | 4/2000 |
| CN | 2007131803 | 11/2007 |
| CN | 101659757 | 3/2010 |
| CN | 101166781 | 10/2011 |
| CN | 103665425 | 3/2014 |
| EP | 2450480 A1 * | 5/2012 |
| JP | H0957744 | 3/1997 |
| JP | H10323833 | 12/1998 |
| JP | H11245290 | 9/1999 |
| JP | 2000063557 | 2/2000 |
| JP | 2003509249 | 3/2003 |
| JP | 2003525142 | 8/2003 |
| JP | 2012171276 | 9/2012 |
| JP | 2014133373 | 7/2014 |
| TW | 202102590 | 1/2021 |

OTHER PUBLICATIONS

Anton Paar; Intrinsic Viscosity as Quality Control Parameter of PET Relevant for: Polymers, Plastics, ISO 1628, PET https://www.muser-my.com/wp-content/uploads/2018/11ZC72IA036EN-A.pdf (Year: 2018).*
BE1019138A5 machine translation (Year: 2012).*
EP2450480 machine translation (Year: 2012).*
Office Action of Taiwan Counterpart Application, dated Dec. 16, 2021, pp. 1-7.
"Office Action of Japan Counterpart Application", dated Aug. 16, 2022, pp. 1-6.
"Office Action of Japan Counterpart Application", dated Nov. 22, 2022, p. 1-p. 4.

* cited by examiner

*Primary Examiner* — Terressa Boykin
(74) *Attorney, Agent, or Firm* — JCIPRNET

(57) ABSTRACT

A method for forming polyester material from recycled film including the following steps is provided: performing a film surface treatment on the recycled film to form a recycled material including polyester; fragmenting the recycled material to form a recycled chipped material, wherein the recycled chipped material has a first intrinsic viscosity; and forming the polyester material by the recycled chipped material, wherein the polyester material has a second intrinsic viscosity, and the second intrinsic viscosity is greater than the first intrinsic viscosity.

7 Claims, 1 Drawing Sheet

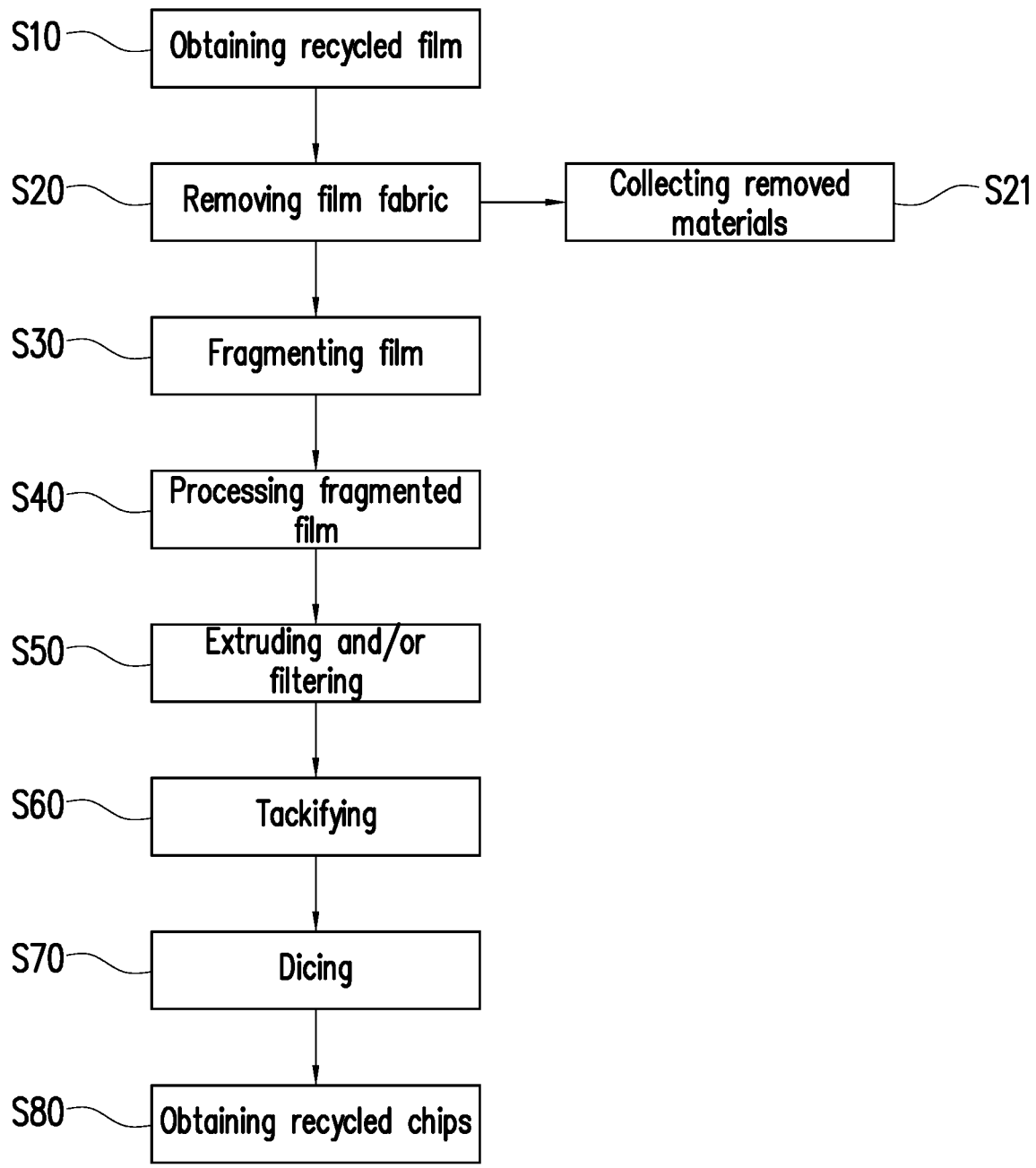

METHOD FOR FORMING POLYESTER MATERIAL FROM RECYCLED FILM

CROSS-REFERENCE TO RELATED APPLICATION

This application claims the priority benefit of Taiwanese application no. 110115540, filed on Apr. 29, 2021. The entirety of the above-mentioned patent application is hereby incorporated by reference herein and made a part of this specification.

BACKGROUND

Technical Field

The disclosure relates to a method of forming a polyester material, and particularly relates to a method of forming a polyester material from a recycled film.

Description of Related Art

With the trend that the market is gradually developed towards circular economy or plastic recycling, under the premise that mechanical properties and processability will not be greatly affected, how to introduce environmentally friendly recycled materials to help achieve the goal of plastic reduction and energy saving globally has become the issue for research.

Polyester materials are used in PET bottles or fabrics. However, there is really little interest in the recycling and remanufacturing of other products containing polyester materials.

SUMMARY

The disclosure provides a method for forming a polyester material from a recycled film, which may make the formed polyester material have better material strength and/or workability.

A method for forming polyester material from recycled film includes the following steps: performing a film surface treatment on the recycled film to form a recycled material including polyester; fragmenting the recycled material to form a recycled chipped material, wherein the recycled chipped material has a first intrinsic viscosity; and forming the polyester material by the recycled chipped material, wherein the polyester material has a second intrinsic viscosity, and the second intrinsic viscosity is greater than the first intrinsic viscosity.

In an embodiment of the disclosure, the step of performing film surface treatment on the recycled film is: physically removing the surface material of the recycled film.

In an embodiment of the disclosure, the first intrinsic viscosity is less than or equal to 0.6 dL/g, and/or the second intrinsic viscosity is greater than or equal to 0.63 dL/g.

In an embodiment of the disclosure, the method of forming a polyester material through the recycled chipped material includes: placing the recycled chipped material in an extruding apparatus, and performing a heating step on the recycled chipped material placed in the extruding apparatus, thereby forming the polyester material through the extruding apparatus.

In an embodiment of the disclosure, the heating step is to perform heating to 230° C. to 300° C.

In an embodiment of the disclosure, the time for the heating step is 15 minutes to 60 minutes.

In an embodiment of the disclosure, the method of forming a polyester material through the recycled chipped material further includes: performing a depressurization step on the recycled chipped material placed in the extruding apparatus.

In an embodiment of the disclosure, the depressurization step is performed to make the atmospheric pressure between 1 mbar and 6 mbar.

In an embodiment of the disclosure, the time for the depressurization step is 15 minutes to 60 minutes.

In an embodiment of the disclosure, the method of forming the polyester material is performed continuously.

Based on the above, the method for forming a polyester material from a recycled film of the disclosure may make the formed polyester material have better material strength and/or workability.

BRIEF DESCRIPTION OF THE DRAWINGS

FIGURE is a schematic partial flow diagram of a method for forming a polyester material from a recycled film according to an embodiment of the disclosure.

DESCRIPTION OF THE EMBODIMENTS

In the following detailed description, for the purpose of illustration and not limitation, exemplary embodiments revealing specific details are set forth to provide a thorough understanding of various principles of the disclosure. However, it will be obvious to those skilled in the art that, because of the present disclosure, the disclosure may be implemented in other embodiments that depart from the specific details disclosed herein. In addition, descriptions of commonly-known apparatuses, methods, and materials may be omitted so as not to deviate the focus on the description of various principles of the disclosure.

A range may be expressed herein as from "about" a specific value to "about" another specific value, and it may also be directly expressed as a specific value and/or to another specific value. When expressing the range, another embodiment includes from said one specific value and/or to another specific value. Similarly, when a value is expressed as an approximation by using the antecedent "about", it may be understood that the specific value forms another embodiment. It should be further understood that the endpoint of each range is obviously related to or independent of the other endpoint.

In this disclosure, non-limiting terms (such as possible, may, for example, or other similar terms) are optional or selective implementations, inclusions, additions or presence.

Unless otherwise defined, all terms (including technical terms and scientific terms) used herein have the same meanings commonly understood by those with ordinary knowledge in the technical field to which the present disclosure belongs. It should also be understood that the terms (such as those defined in commonly used dictionaries) should be interpreted as having meanings consistent with the meanings in the relevant technical context, and should not be interpreted in an idealized or overly formal sense, unless specifically defined as such herein.

[Recycled Film]

A method of obtaining recycled films includes, for example, collecting various types of recycled films containing polyester materials; corresponding classifications may be made according to the types, colors, and/or uses of the aforementioned recycled films. The aforementioned recycled film may include, for example, industrial recycled PET film, but the disclosure is not limited thereto.

It should be noted that the terms "polyester", "polyester material" and the like in the disclosure refer to any type of polyester, especially aromatic polyester, and here particularly refer to polyester (i.e., polyethylene terephthalate; PET) derived from terephthalic acid (PTA) and ethylene glycol (EG).

In addition, the polyester herein may also be, for example, poly-propylene terephthalate, polybutylene terephthalate, polyethylene naphthalate or a combination of the above. In this embodiment, the polyester is preferably polyethylene terephthalate, poly-propylene terephthalate or a combination of the above. In addition, a copolymer may also be used, and it specifically refers to a copolymer that may be obtained by using two or more dicarboxylic acids and/or two or more diol components.

[Treatment on Recycled Film]

A film surface treatment may be performed on the recycled film to from a recycled material containing more content of polyester (compared to the recycled film before the film surface treatment).

In this embodiment, the surface material (which may be referred to as: film fabric) that forms the film surface of the recycled film may be removed by means of proper physical methods such as breaking through the surface of a scraper, blowing the scraped objects away through air and/or cleansing, so as to form the recycled material. For example, as shown in step S10 to step S20, the recycled film includes, for example, a recycled polyester film, and may be processed in combination with continuous processes such as breaking through the surface of a scraper, blowing the scraped objects away through air and cleansing to remove the surface material.

In an embodiment, the surface material of the recycled film includes, for example, a corresponding adhesive or layer, a release agent or layer, a colorant or a coating, etc., but the disclosure is not limited thereto. In an embodiment, the polyester content of the aforementioned surface material is relatively low (compared to recycled materials and/or compared to the entire recycled film before film surface treatment).

In an embodiment, the removed surface material may be collected and/or processed in a proper manner (shown in step S21), but the disclosure is not limited thereto.

[Treatment on Recycled Material]

In this embodiment, the recycled material may be fragmented (as shown in step S30) by physical means (for example, mechanical crushing or mechanical cutting) to form the recycled chipped material. In other words, compared with recycled materials, the size of fragmented recycled materials may be smaller. For example, the recycled material may be in sheet or film shape, and the fragmented recycled material may be in block, powder or granular shape.

In an embodiment, the recycled chipped material may be further subjected to film fragmenting treatment (for example, as shown in step S40). For example, the aforementioned film fragmenting treatment includes, for instance, heating and/or low-pressure placement to further dry the fragmented recycled material, but the disclosure is not limited thereto. In another example, the aforementioned film fragmenting treatment includes, for instance, a corresponding compaction treatment, but the disclosure is not limited thereto.

In this embodiment, the fragmented recycled material has a corresponding intrinsic viscosity (IV). In an embodiment, the intrinsic viscosity of the fragmented recycled material is less than or equal to 0.6 dL/g.

[Formation of Polyester Material]

As shown in step S50 to step S80, recycled chipped materials may be formed into polyester materials. In this embodiment, the recycled chipped material may be reshaped (for example, the polyester molecules in it are rearranged) through melting, filtering and extruding steps to form a polyester material. The polyester material may include recycled polyester chips after pelletizing. In an embodiment, the polyester chips formed by the aforementioned physical remanufacturing process may be referred to as physical recycled polyester chips.

For example, the recycled chipped material is placed in an extruding apparatus. The extruding apparatus includes, for example, a single screw extruder (SSE), a twin screw extruder (TSE) or other similar screw extruders. The extruding apparatus may melt the recycled chipped material to make it appear in a molten state. Then, the recycled chipped material in the molten state may be filtered by a filter screen to remove solid impurities in the recycled chipped material. Afterwards, the filtered recycled polyester material may be extruded and pelletized to form physical recycled polyester chips.

In this embodiment, since the recycled chipped material is a material that has been fragmented by physical means, the time and/or energy consumption required for melting may be reduced.

In an embodiment, the aforementioned extruding apparatus may include a feeder (such as a side feeder) attached to the extruding machine, but the disclosure is not thereto. During or before extruding the polyester material, suitable additives may be mixed in by a feeder, but the disclosure is not limited thereto.

In this embodiment, the recycled chipped material in the extruding apparatus may be heated to about 230° C. to 300° C., and the heating time may be about 15 minutes to 60 minutes. In this way, the intrinsic viscosity of the polyester material may be improved. In an embodiment, the heating step may be performed by a corresponding heating apparatus (such as a resistive heater, but not limited thereto), so that at least the corresponding recycled chipped material is heated to a suitable temperature. In an embodiment, the intrinsic viscosity of the polyester material may be greater than or equal to 0.63 dL/g and less than or equal to 1.2 dL/g.

In this embodiment, a depressurization step may be performed on the recycled chipped material placed in the extruding apparatus. Therefore, the gas in the recycled chipped materials (such as the gas between the block, powder or granular shaped recycled chipped materials) may be discharged more easily, and/or the volatile substance in the recycled chipped materials may be discharged more easily. In this way, the intrinsic viscosity of the polyester material may be improved.

In this embodiment, the depressurization step may make the atmospheric pressure to reduce to about 1 mbar to 6 mbar, and the time for the depressurization step may be about 15 minutes to 60 minutes. In an embodiment, the depressurization step may be performed through a corresponding exhaust apparatus (such as a gas pump, but not limited thereto), so that at least the environmental space in which the corresponding recycled chipped material is located is at a suitable air pressure atmosphere.

In an embodiment, the recycled chipped material placed in the extruding apparatus may be heated and depressurized.

In this way, the intrinsic viscosity of the polyester material may be made greater than the intrinsic viscosity of the recycled chipped material.

In an embodiment, the recycled chipped material placed in the extruding apparatus may be heated to about 260° C. to 270° C., and the atmospheric pressure is reduced to about 5 mbar, and the time for heating to the aforementioned temperature and for depressurization to the aforementioned atmospheric pressure may be about 15 minutes to 20 minutes. In this way, if the intrinsic viscosity of the recycled chipped material is about 0.6 dL/g, the intrinsic viscosity of the polyester material may be about 0.72 dL/g.

In an embodiment, the recycled chipped material placed in the extruding apparatus may be heated to about 260° C. to 270° C., and the atmospheric pressure is reduced to about 5 mbar, and the time for heating to the aforementioned temperature and for depressurization to the aforementioned atmospheric pressure may be about 30 minutes to 40 minutes. In this way, if the intrinsic viscosity of the recycled chipped material is about 0.6 dL/g, the intrinsic viscosity of the polyester material may be about 0.85 dL/g.

In an embodiment, the recycled chipped material placed in the extruding apparatus may be heated to about 260° C. to 270° C., and the atmospheric pressure is reduced to about 2 mbar, and the time for heating to the aforementioned temperature and for depressurization to the aforementioned atmospheric pressure may be about 30 minutes to 40 minutes. In this way, if the intrinsic viscosity of the recycled chipped material is about 0.6 dL/g, the intrinsic viscosity of the polyester material may be about 0.75 dL/g.

In an embodiment, the recycled chipped material placed in the extruding apparatus may be heated to about 260° C. to 270° C., and the atmospheric pressure is reduced to about 5 mbar, and the time for heating to the aforementioned temperature and for depressurization to the aforementioned atmospheric pressure may be about 50 minutes to 60 minutes. In this way, if the intrinsic viscosity of the recycled chipped material is about 0.6 dL/g, the intrinsic viscosity of the polyester material may be about 1.05 dL/g.

In this embodiment, by means of the method of performing film surface treatment on the recycled film, the influence on the hue of the polyester material may be reduced. In addition, the influence of other non-polyester materials on the intrinsic viscosity may be decreased. In this way, the polyester material may have better material strength and/or workability.

In this embodiment, the polyester material formed by the above method may be used for manufacturing corresponding products by means of other suitable application methods such as injection, injection blowing, extrusion, and special-shaped extrusion.

In this embodiment, the foregoing process may be performed in a continuous manner.

In this way, the efficiency of forming polyester material from recycled film may be improved.

In this embodiment, the polyester material formed in the above manner may be polyester material that is formed without using a conventional solid state polymerization process and/or by using a common chain extender modification.

In summary, the method for forming a polyester material from a recycled film of the disclosure may make the formed polyester material have better material strength and/or workability.

What is claimed is:

1. A method for forming a polyester material from a recycled film, comprising:
    performing a film surface treatment on the recycled film to form a recycled material comprising polyester;
    fragmenting the recycled material to form a recycled chipped material, wherein the recycled chipped material has a first intrinsic viscosity; and
    forming the polyester material by the recycled chipped material, wherein the polyester material has a second intrinsic viscosity, and the second intrinsic viscosity is greater than the first intrinsic viscosity, wherein:
        the step of performing the film surface treatment on the recycled film is: performing a physically method comprising breaking through the surface of a scraper, blowing the scraped objects away through air and/or cleansing to remove a surface material of the recycled film; and
        the method of forming the polyester material by the recycled chipped material comprises: placing the recycled chipped material in an extruding apparatus, and performing a heating step and a depressurization step on the recycled chipped material placed in the extruding apparatus, thereby forming the polyester material through the extruding apparatus.

2. The method for forming the polyester material according to claim 1, wherein the first intrinsic viscosity is less than or equal to 0.6 dL/g, and/or the second intrinsic viscosity is greater than or equal to 0.63 dL/g.

3. The method for forming the polyester material according to claim 1, wherein the heating step is to perform heating to 230° C. to 300° C.

4. The method for forming the polyester material according to claim 3, wherein a time for the heating step is 15 minutes to 60 minutes.

5. The method for forming the polyester material according to claim 1, wherein the depressurization step is performed to make an atmospheric pressure between 1 mbar and 6 mbar.

6. The method for forming the polyester material according to claim 5, wherein a time for the depressurization step is 15 minutes to 60 minutes.

7. The method for forming the polyester material claimed in claim 1 is performed in a continuous manner.

* * * * *